US011131208B2

(12) United States Patent
Auker et al.

(10) Patent No.: US 11,131,208 B2
(45) Date of Patent: Sep. 28, 2021

(54) EMBEDDED ELECTRIC GENERATOR IN TURBINE ENGINE (71) Applicant: Rolls-Royce North American Technologies, Inc., Indianapolis, IN (US)

(72) Inventors: Bradley Eugene Auker, Coatesville, IN (US); Edward Claude Rice, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 225 days.

(21) Appl. No.: 15/253,978

(22) Filed: Sep. 1, 2016

(65) Prior Publication Data

US 2018/0058243 A1 Mar. 1, 2018

(51) Int. Cl.
*F01D 15/10* (2006.01)
*F02K 3/06* (2006.01)
*F02C 7/32* (2006.01)
*F02C 3/04* (2006.01)
*H02K 7/18* (2006.01)
*H02K 9/04* (2006.01)

(52) U.S. Cl.
CPC ............... *F01D 15/10* (2013.01); *F02C 3/04* (2013.01); *F02C 7/32* (2013.01); *F02K 3/06* (2013.01); *H02K 7/1823* (2013.01); *H02K 9/04* (2013.01); *F05D 2220/76* (2013.01); *Y02T 50/60* (2013.01)

(58) Field of Classification Search
CPC ........ F01D 15/10; H02K 7/1823; H02K 9/04; Y02E 10/22; F02C 3/04; F02C 7/32; F02K 3/06; F05D 2220/76

USPC .................................................. 290/52, 1 B
See application file for complete search history.

(56) References Cited

U.S. PATENT DOCUMENTS

| 3,489,377 | A |   | 1/1970 | Pearson et al. |
| 3,831,373 | A | * | 8/1974 | Flynt ........................ F02C 6/16 290/52 |
| 4,104,535 | A | * | 8/1978 | Bronicki ................. F01K 13/02 290/40 F |
| 4,253,031 | A | * | 2/1981 | Frister ..................... F01D 15/10 290/52 |

(Continued)

FOREIGN PATENT DOCUMENTS

| EP | 0798454 A2 | 10/1997 |
| EP | 2085589 A2 | 8/2009 |

(Continued)

OTHER PUBLICATIONS

Extended Search Report from counterpart European Application No. 17184693.4, dated Jan. 25, 2018, 10 pp.

(Continued)

*Primary Examiner* — Charles Reid, Jr.
(74) *Attorney, Agent, or Firm* — Shumaker & Sieffert, P.A.

(57) ABSTRACT

A turbine engine is described that includes an intake, an inlet duct configured to receive fluid from the intake, and an outer bypass duct configured to receive fluid from the intake. The turbine engine further includes a drive shaft, a tower shaft mechanically coupled to the drive shaft, and an electric generator mechanically coupled to the tower shaft. The electric generator is located between the inlet duct and the outer bypass duct.

20 Claims, 5 Drawing Sheets

(56) References Cited

U.S. PATENT DOCUMENTS

| | | | | |
|---|---|---|---|---|
| 4,739,180 | A * | 4/1988 | Yanoma | F01K 25/00 290/2 |
| 5,694,765 | A * | 12/1997 | Hield | F02C 3/113 60/39.163 |
| 7,870,719 | B2 | 1/2011 | Lee et al. | |
| 8,198,744 | B2 | 6/2012 | Kern et al. | |
| 8,966,911 | B2 | 3/2015 | Ress et al. | |
| 2004/0177603 | A1* | 9/2004 | Hewitt | F02K 9/64 60/205 |
| 2005/0183540 | A1* | 8/2005 | Miller | F02C 7/32 74/665 GA |
| 2006/0042227 | A1* | 3/2006 | Coffinberry | F02C 6/08 60/226.1 |
| 2006/0248900 | A1 | 11/2006 | Suciu et al. | |
| 2007/0151258 | A1 | 7/2007 | Gaines et al. | |
| 2008/0110151 | A1 | 5/2008 | Welch et al. | |
| 2010/0107650 | A1* | 5/2010 | Ress, Jr. | F02C 7/32 60/784 |
| 2010/0175387 | A1* | 7/2010 | Foust | F01D 9/023 60/782 |
| 2010/0327589 | A1* | 12/2010 | Macchia | F01D 15/10 290/52 |
| 2011/0154827 | A1 | 6/2011 | Ress, Jr. et al. | |
| 2012/0128487 | A1 | 5/2012 | Eames | |
| 2012/0133150 | A1 | 5/2012 | Dooley et al. | |
| 2014/0026700 | A1 | 1/2014 | Beier | |
| 2014/0263824 | A1 | 9/2014 | Pesyna et al. | |
| 2015/0048617 | A1* | 2/2015 | Veilleux, Jr. | F02C 7/14 290/52 |
| 2015/0145256 | A1* | 5/2015 | Omoruyi | F01D 15/10 290/52 |
| 2016/0178464 | A1* | 6/2016 | Burns | F02C 3/10 73/112.01 |
| 2017/0363003 | A1* | 12/2017 | Evetts | B64D 29/00 |

FOREIGN PATENT DOCUMENTS

| | | |
|---|---|---|
| GB | 2095757 A | 10/1982 |
| WO | 9502120 A1 | 1/1995 |
| WO | 2014158247 A1 | 10/2014 |

OTHER PUBLICATIONS

Response to Extended Search Report dated Jan. 25, 2018, from counterpart European Application No. 17184693.4, filed Sep. 5, 2018, 4 pp.

Communication pursuant to Article 94(3) EPC from counterpart EP Application No. 17184693.4 dated Mar. 3, 2020, 6 pgs.

\* cited by examiner

EMBEDDED ELECTRIC GENERATOR IN TURBINE ENGINE

TECHNICAL FIELD

This disclosure relates to electrical power generation in turbine engines.

BACKGROUND

A turbine engine is a type of internal combustion engine that may drive an electric generator for converting mechanical power produced by the turbine engine to electrical power used by other components of a system. Some applications (e.g., due to size and weight restrictions) may require the electric generator to be located within the housing of the turbine engine. During operation, some internally-located electric generators may produce excess heat that may interfere with operations being performed by the electric generator and/or other collocated components of the turbine engine. In addition, performing maintenance or inspections of some internally-located electric generators may be difficult as other collocated components of the turbine engine obstruct access to the electric generator.

SUMMARY

In some examples, the disclosure describes a turbine engine comprising an intake, an inlet duct configured to receive fluid from the intake, and an outer bypass duct configured to receive fluid from the intake. The turbine engine further comprises a drive shaft, a tower shaft mechanically coupled to the drive shaft, and an electric generator mechanically coupled to the tower shaft, wherein the electric generator is located between the inlet duct and the outer bypass duct.

In some examples, the disclosure describes a method comprising receiving, at an electric generator located between an inlet duct and an outer bypass duct of a turbine engine, via a tower shaft mechanically coupled to a drive shaft of the turbine engine, mechanical power. The method further comprises generating, based on the mechanical power received from the tower shaft, electrical power. The method further comprises outputting the electrical power to an electrical load.

In some examples, the disclosure describes an electric generator module comprising a mechanical input configured to connect to a tower shaft that is mechanically coupled to a drive shaft of a turbine engine, wherein the tower shaft protrudes through a cavity of the turbine engine located between an inlet duct of the turbine engine and an outer bypass duct of the turbine engine, and receive mechanical power from the tower shaft. The electric generator module further comprises a power generation component configured to produce electrical power from mechanical power received by the mechanical input. The electric generator module further comprises an electrical output configured to output the electrical power produced by the power generation component to an electrical load.

The details of one or more examples are set forth in the accompanying drawings and the description below. Other features, objects, and advantages will be apparent from the description and drawings, and from the claims.

DETAILED DESCRIPTION

In general, this disclosure describes techniques for positioning an electric generator within a cooler section or cavity of a turbine engine so as to improve overall heat dissipation from the electric generator, enable easier maintenance of the electric generator, and generally improve the overall design of the turbine engine. Unlike other turbine engines that may include an electric generator positioned in a traditional location beneath the inlet duct to the compressor, an example turbine engine may include an electric generator positioned between an inlet duct and an outer bypass duct of the turbine engine. Positioning the electric generator between the inlet duct and the outer bypass duct may provide several advantages. For example, repositioning the electric generator in this way may configure the turbine engine to more easily dissipate heat produced by the electric generator (e.g., via the relatively cool fluid passing through the outer bypass duct). In addition, relocating the electric generator outside the traditional electric generator location and adjacent to the outer bypass duct may improve access to the electric generator for maintenance personnel performing maintenance tasks. That is, positioning the electric generator right beneath the outer bypass duct may minimize, or altogether eliminate, the need for maintenance personnel to disassemble or remove other components of the turbine engine in order to access the electric generator.

Figure 1:
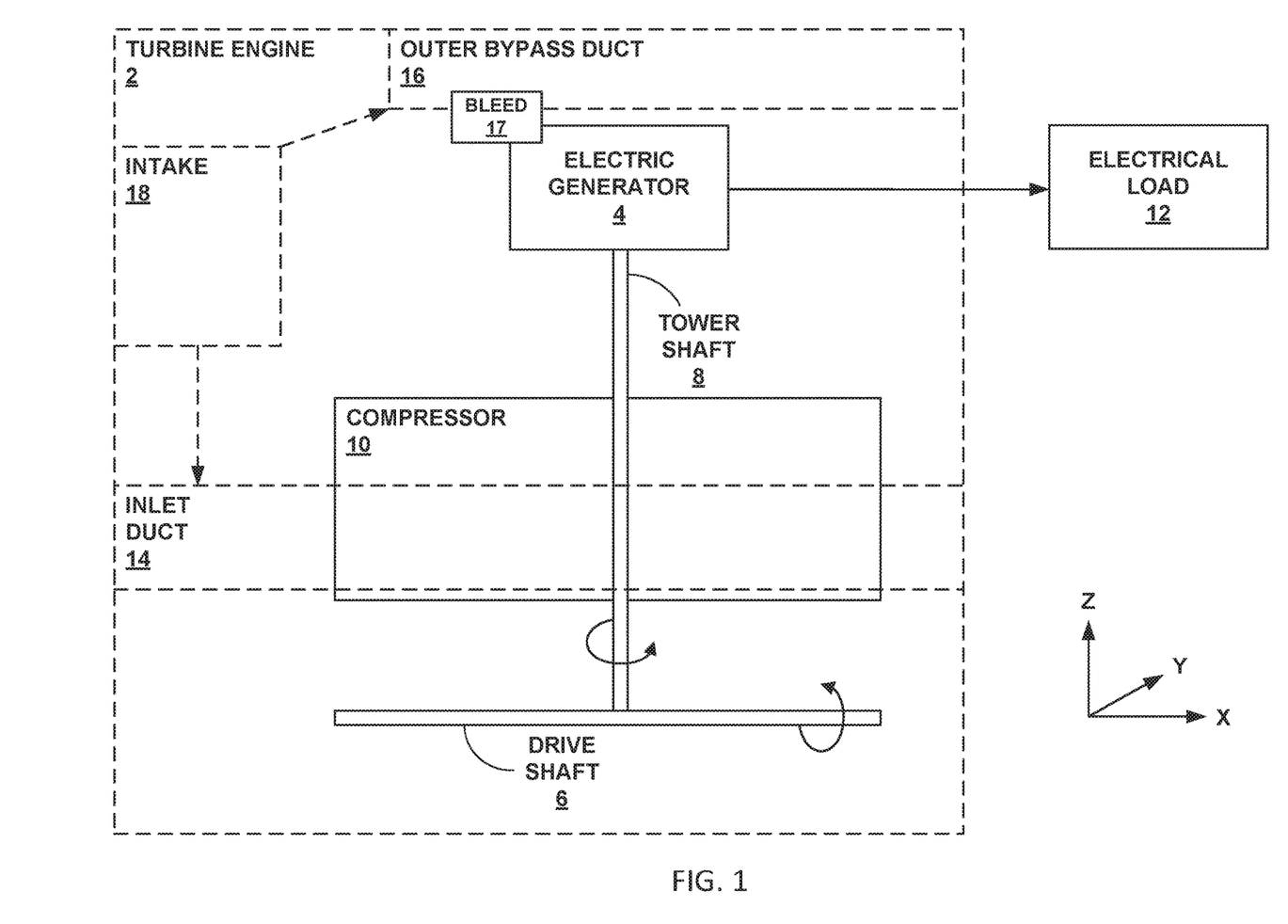
FIG. 1 is a conceptual diagram illustrating a turbine engine with an electric generator for producing electrical power, in accordance with one or more techniques of this disclosure.

FIG. 1 is a conceptual diagram illustrating a turbine engine 2 with an electric generator 4 for producing electrical power, in accordance with one or more techniques of this disclosure. Turbine engine 2 may be configured to convert one form of power to mechanical energy in the form of a rotating turbine. The mechanical energy produced by turbine engine 2 may be used in a variety of ways or for a variety of systems and applications (e.g., aircraft, locomotives, watercraft, power plants, electric generators, and any or all other systems and applications that rely on mechanical energy from a turbine engine to perform work).

Turbine engine 2 may comprise electric generator 4, drive shaft 6, tower shaft 8, compressor 10, inlet duct 14, outer bypass duct 16, and intake 18, plus additional components not shown in FIG. 1. Turbine engine 2 may comprise a gas turbine engine, a nuclear turbine engine, a steam turbine engine, or any other suitable turbine engine.

Turbine engine 2 may reside within a three-dimensional space represented by X, Y, and Z directions, as shown in FIG. 1. Drive shaft 6 may extend in the X direction, where the X-Y plane represents a horizontal plane. The Y direction may be at least partially into and out of the page in FIG. 1. Tower shaft 8 may extend in the Z direction, which may represent a vertical direction, such that electric generator 4 may be positioned above (e.g., in the vertical Z direction)

drive shaft 6. Tower shaft 8 is depicted as extending in the Z direction, but tower shaft 8 may also extend partially in the X or Y directions.

Drive shaft 6 is configured to rotate based on the rotation of a turbine in turbine engine 2. In some examples, drive shaft 6 may comprise a low-pressure (LP) shaft that is mechanically coupled to an LP turbine. Drive shaft 6 may be oriented in a horizontal direction, which is represented by the X direction in FIG. 1. The rotational velocity of drive shaft 6 may depend on the diameter of drive shaft 6 and the size of turbine engine 2.

Tower shaft 8 is configured to rotate based on the rotation of drive shaft 6. Tower shaft 8 may be mechanically coupled to drive shaft 6 by a gearbox. Several components in turbine engine 2 may be mechanically coupled to tower shaft 6, such as a fuel pump and/or a hydraulic pump. Tower shaft 8 may deliver mechanical power to electric generator 4 and other components in turbine engine 2. Tower shaft 8 may extend radially away from drive shaft 6 in the Z direction. Tower shaft 8 may also extend partially in the X and Y directions.

Compressor 10 is configured to compress fluid, such as air or another gas, that is moving through turbine engine 2. The compressed fluid, along with injected fuel, may be combusted in a combustor (not shown in FIG. 1) to provide mechanical power to a high-pressure (HP) turbine. Compressor 10 may operate within inlet duct 14 of turbine engine 2 that receives fluid from an intake of turbine engine 2. Compressor 10 may run on mechanical power from drive shaft 6, a LP shaft, an HP shaft, or another source. Compressor 10 may be an axial compressor, a centrifugal compressor, or another type of compressor that produces compressed fluid.

Electrical load 12 is configured to receive electrical power produced by electric generator 4. In some examples, electrical load 12 may include at least two electrical loads coupled to a power bus. Electrical load 12 may comprise any type of electrical load, such as a fuel pump, a hydraulic pump, a cabin load, an interior lighting and display system, a heating and cooling system, or other loads added by the system designer. The connection between electric generator 4 and electrical load 12 may include one or more power converters for converting one form of electricity to a second form of electricity.

Inlet duct 14 is configured to receive fluid such as air or another gas from intake 18. The fluid in inlet duct 14 (referred to in some examples as "core exhaust") may pass through compressor 10 for compression and later fuel injection. The temperature of the fluid in inlet duct 14 may increase as the pressure in inlet duct 14 increases.

Outer bypass duct 16 is configured to receive fluid from intake 18. The fluid in outer bypass duct 16 (referred to in some examples as "bypass exhaust") may be cooler than the fluid in inlet duct 14 and/or the fluid in compressor 10. The fluid in outer bypass duct 16 may remain at or near the temperature outside of turbine engine 2 because the fluid in outer bypass duct 16 may be uncompressed. Outer bypass duct 16 may comprise a bleed 17, such as a block and bleed valve, configured to provide cooling to electric generator 4.

Intake 18 is configured to receive fluid from outside turbine engine 2. Intake 18 may provide the fluid to inlet duct 14 and outer bypass duct 16 and other components within turbine engine 2.

Electric generator 4 is configured to convert mechanical power to electrical power for use by other components or circuits. Electric generator 4 may comprise a direct-current (DC) generator or an alternating-current (AC) generator such as an induction generator. Electric generator 4 may comprise Halbach array generator with permanent magnets on a rotor. A Halbach array is an array of magnets that cancels, or nearly cancels, the magnetic field on one side of the array.

Electric generator 4 may comprise a mechanical input configured to connect to tower shaft 8. The mechanical input may receive mechanical power from tower shaft 8. Electric generator 4 may generate and output DC or AC electricity to electrical load 12. Electric generator 4 may further comprise an electrical output configured to deliver the electricity to electrical load 12. Electric generator 4 may comprise a power converter for converting AC to DC or vice versa before electric generator 4 outputs the electricity to electrical load 12.

Electric generator 4 may generate heat during operation (e.g., due to friction from the moving components of electric generator 4 and/or electrical power dissipation). Unless adequately dissipated, the heat from electric generator 4 may degrade the stability or functioning of electric generator 4 or nearby components. Electric generator 4 may also require occasional maintenance, which may require access to electric generator 4 within turbine engine 2.

In accordance with the techniques of this disclosure, electric generator 4 may be mechanically coupled to tower shaft 8 and located between inlet duct 14 and outer bypass duct 16 of turbine engine 2. Coupling electric generator 4 to tower shaft 8 between inlet duct 14 and outer bypass duct 16 may improve the heat dissipation of electric generator 4, which may reduce the need for costly heat exchangers. For example, the fluid in outer bypass duct 16 may be cooler than the fluid in inlet duct 14. Positioning electric generator 4 between inlet duct 14 and outer bypass duct 16 may enable turbine engine 2 to dissipate heat from electric generator 4 using relatively simple heat exchangers that use fluid from outer bypass duct 16. Coupling electric generator 4 to tower shaft 8 between inlet duct 14 and outer bypass duct 16 may also improve the ease of access to electric generator 4 for maintenance. For example, a technician may be able to more easily access electric generator 4 for maintenance or inspections from outer bypass duct 16 than if electric generator 4 were to be positioned at a different location within turbine engine 2. That is, at other positions within turbine engine 2, electric generator 4 may be less accessible during maintenance or inspections because other components of turbine engine 2, such as compressor 10 and drive shaft 6, may obstruct access to electric generator 4. Easier access to electric generator may reduce the number of components in turbine engine 2 that a technician has to remove or disassemble during a maintenance or inspection process.

Locating electric generator 4 on tower shaft 8 between inlet duct 14 and outer bypass duct 16 may improve the design of turbine engine 2. For example, by coupling electric generator 4 to tower shaft 8, between inlet duct 14 and outer bypass duct 16, the number of components in turbine engine 2 may be reduced. That is, unlike with some other turbine generators with internal electric generators, turbine engine 2 may not require an additional generator shaft and/or gearbox to mechanically couple the additional generator shaft to drive shaft 6 may if electric generator 4 is mechanically coupled to tower shaft 8. In addition, by placing electric generator 4 inside turbine engine 2 between inlet duct 14 and outer bypass duct 16, turbine engine 2 may have additional space to include other components that may otherwise need to be located outside of turbine engine 2. Moreover, repositioning of electric generator 4 between inlet duct 14 and outer bypass duct 16 may enable turbine engine 2 to rely on electrically powered components, as opposed to mechanically powered components (e.g., fuel pumps, hydraulic pumps, and the like), which may lead to more efficient use of space in and around turbine engine 2. By implementing electrically powered components, as opposed to mechanically powered components, a gearbox under turbine engine 2 may not be necessary to deliver mechanical power to the components. The elimination of the gearbox under turbine engine 2 may reduce the weight of turbine engine 2 and/or the surrounding system. Moreover, the electrically powered components may be arranged in a more efficient manner in and around turbine engine 2, as compared to mechanically powered components.

Figure 2:
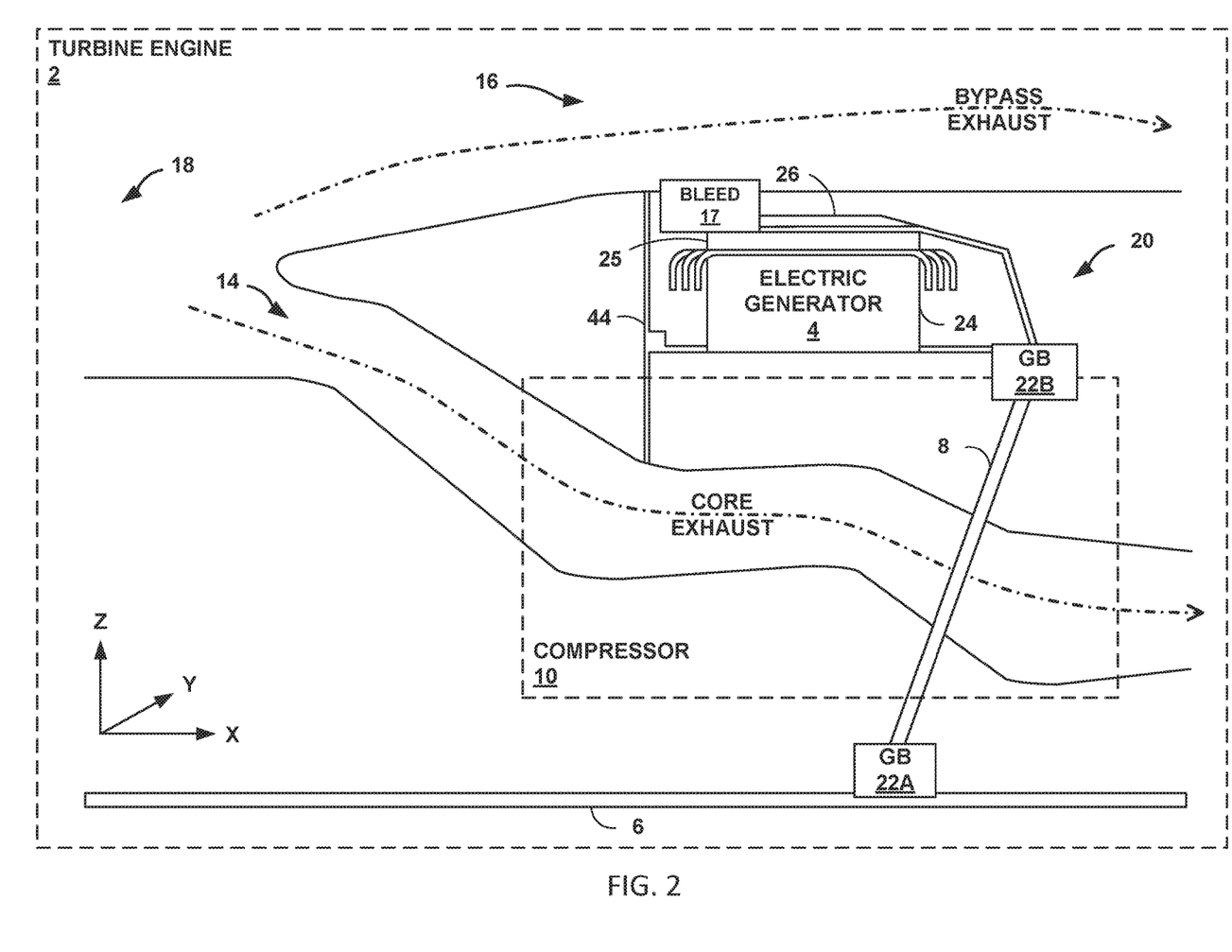
FIG. 2 is a conceptual diagram illustrating further details of the turbine engine of FIG. 1 which includes an electric generator mechanically coupled to a tower shaft, in accordance with one or more techniques of this disclosure.

FIG. 2 is a conceptual diagram illustrating further details of turbine engine 2 of FIG. 1 which includes an electric generator 4 mechanically coupled to a tower shaft 8, in accordance with one or more techniques of this disclosure. FIG. 2 is described below in the context of FIG. 1.

For example, turbine engine 2 may be configured to convert one form of power to mechanical energy in the form of a rotating turbine. Turbine engine 2 may be a gas turbine engine, a nuclear turbine engine, a steam turbine engine, or any other suitable turbine engine. The mechanical energy produced by turbine engine 2 may be used in a variety of ways or for a variety of systems and applications (e.g., aircraft, locomotives, watercraft, power plants, electric generators, and any or all other systems and applications that rely on mechanical energy from a turbine engine to perform work). Turbine engine 2 may include electric generator 4, drive shaft 6, tower shaft 8, and compressor 10, inlet duct 14, outer bypass duct 16, intake 18, cavity 20, and gearboxes 22A, 22B, plus additional components not shown in FIG. 2.

As shown in FIG. 2, turbine engine 2 includes cavity 20 between inlet duct 14 and outer bypass duct 16. Cavity 20 is an open space inside of the boundaries of turbine engine 2 and/or within a housing of turbine engine 2. Cavity 20 may be a cooler section of turbine engine 2, as compared to the temperature of compressor 10, because of the proximity of cavity 20 to outer bypass duct 16. Tower shaft 8 may protrude from drive shaft 6 through compressor 10 and cavity 20. Electric generator 4 may be located in cavity 20 of turbine engine 2 between inlet duct 14 and outer bypass duct 16.

Outer bypass duct 16 may carry bypass exhaust, which may be cooler than the core exhaust carried by inlet duct 14. In operation, core exhaust may travel through compressor 10, which may increase the pressure of the core exhaust, thereby increasing the temperature of the core exhaust. Therefore, positioning electric generator 4 in cavity 20 between inlet duct 14 and outer bypass duct 16 may enable turbine engine 2 to dissipate heat from electric generator 4 using relatively simple heat exchangers 25 that transfer heat from electric generator 4 to the bypass exhaust from outer bypass duct 16. In some examples, heat exchangers 25 may comprise a fuel jacket configured to transfer heat from electric generator 4 to fuel in the fuel jacket. Transferring heat to the fuel in the fuel jacket may allow combustion of the fuel at a higher temperature, thereby improving the efficiency of turbine engine 2.

Tower shaft 8 may be mechanically coupled to drive shaft 6 by gearbox 22A. As indicated above, tower shaft 8 may protrude from drive shaft 6 through compressor 10 and cavity 20. In some examples, tower shaft 8 includes necessary mechanical components to position tower shaft outside of compressor 10 or such that tower shaft bypasses and does not necessarily protrude through compressor 10. In other examples, drive shaft 6 and tower shaft 8 are positioned on the same lateral X-Y plane positioned above compressor 10 such that tower shaft 8 may protrude from drive shaft 6 over compressor 10 and into cavity 20.

Component 26 of electric generator 4 may be mechanically coupled to tower shaft 8 by gearbox 22B. Each of gearboxes 22A, 22B may comprise one or more gears configured to rotate based on the rotational speeds of drive shaft 6, tower shaft 8, and/or component 26. Through gearbox 22A, drive shaft 6 may drive the rotation of tower shaft 8. Through gearbox 22A, tower shaft 8 may drive the rotation of component 26.

Component 26 of electric generator 4 may comprise one or more magnets and/or one or more field coils configured to operate as an electromagnet. Component 26 may be referred to as a "rotor" because component 26 may rotate with respect to component 24, which may comprise one or more electrical windings, through which electrical current may flow. The electrical windings in component 24 may be configured to generate an electric current based on the rotating electromagnetic field generated by the magnets and/or field coils in component 26.

As depicted in FIG. 2, electric generator 4 may be positioned above compressor 10, inlet duct 14, and drive shaft 6. Electric generator 4 may be positioned beneath outer bypass duct 16. Compressor 10 and cavity 20 may be located below outer bypass duct 16. The terms "above" and "beneath" may be defined in terms of the Z or vertical direction shown in FIG. 2. Said differently, electric generator 4 may be positioned between inlet duct 14 and bypass duct 16 and also between bypass duct 16 and compressor 10.

Figure 3:
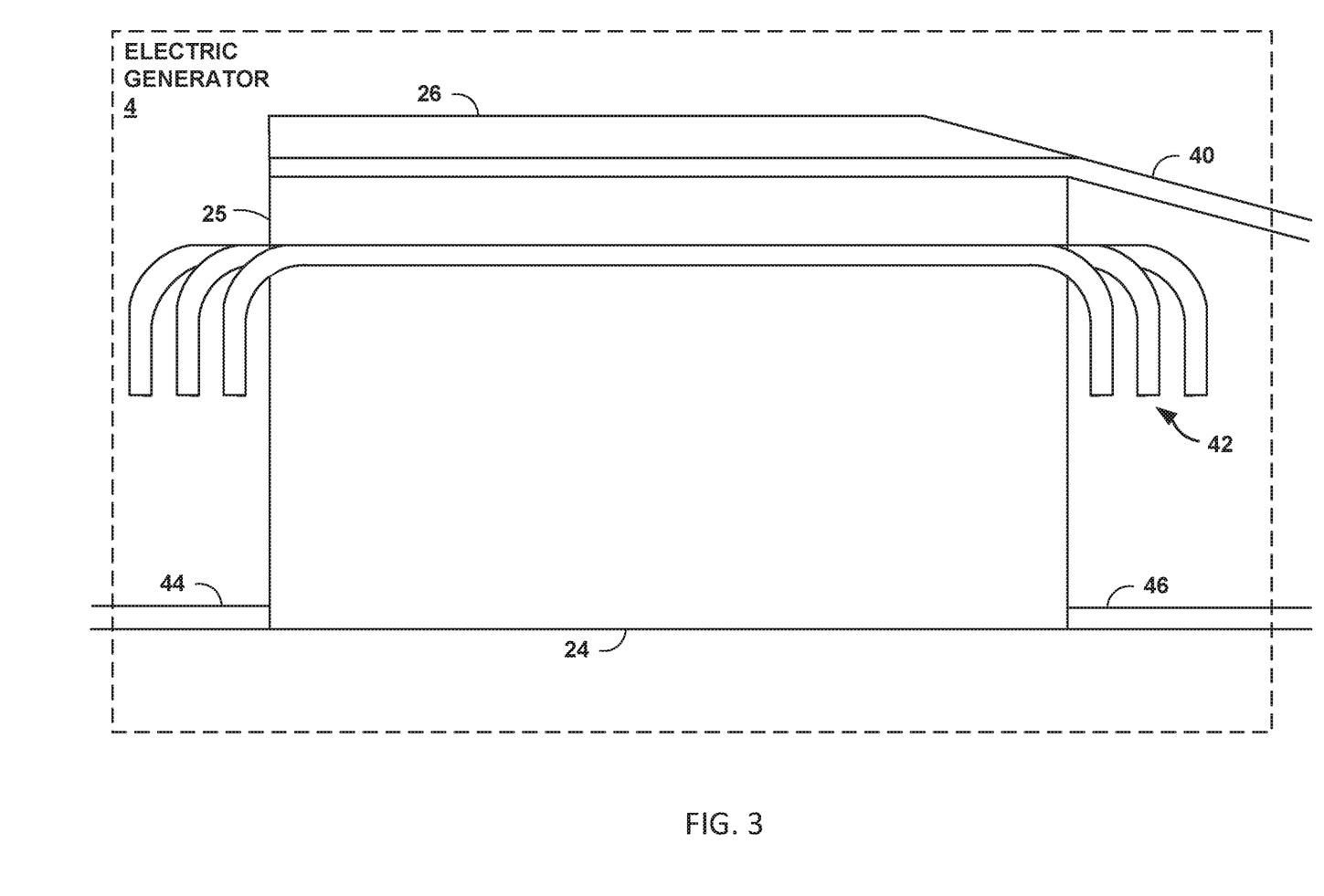
FIG. 3 is a conceptual diagram illustrating further details of the electric generator of FIGS. 1 and 2 which includes two components, in accordance with one or more techniques of this disclosure.

FIG. 3 is a conceptual diagram illustrating further details of electric generator 4 of FIGS. 1 and 2 which includes two components 24, 26, in accordance with one or more techniques of this disclosure. FIG. 3 is described below in the context of FIGS. 1 and 2.

Component 24 of electric generator 4 may be mechanically coupled to support elements 44, 46, which may connect to one or more of compressor 10, inlet duct 14, outer bypass duct 16, and/or gearbox 22B. Component 26 of electric generator 4 may be mechanically coupled to mechanical element 40, which may be mechanically coupled to tower shaft 8 via gearbox 22B.

Component 26 may comprise one or more magnets and/or one or more field coils configured to operate as electromagnets. The magnets and/or field coils may be configured to generate an electromagnetic field that passes through electrical windings 42 in component 24. As the electromagnetic field passes through electrical windings 42, a current may flow through electrical windings 42, thereby generating electrical power. Component 26 may be referred to as a "rotor" because component 26 may rotate relative to component 24. Component 26 may be referred to as a mechanical input configured to receive mechanical power from tower shaft 8 via mechanical element 40 and/or gearbox 22B.

Component 24 may comprise one or more electrical windings 42 through which electrical current may flow based on an electromagnetic field generated by component 26. Component 24 may be referred to as an "armature" or a "stator," even though component 24 may not be stationary in some examples of this disclosure. Component 24 may also be referred to as a power generation component. Component 24 may be configured to produce electrical power from the mechanical power received by component 26. Component 24 may also be referred to as an electrical output. Component 24 may output the electrical power through electrical wires in one or both of support elements 44, 46.

Figure 4:
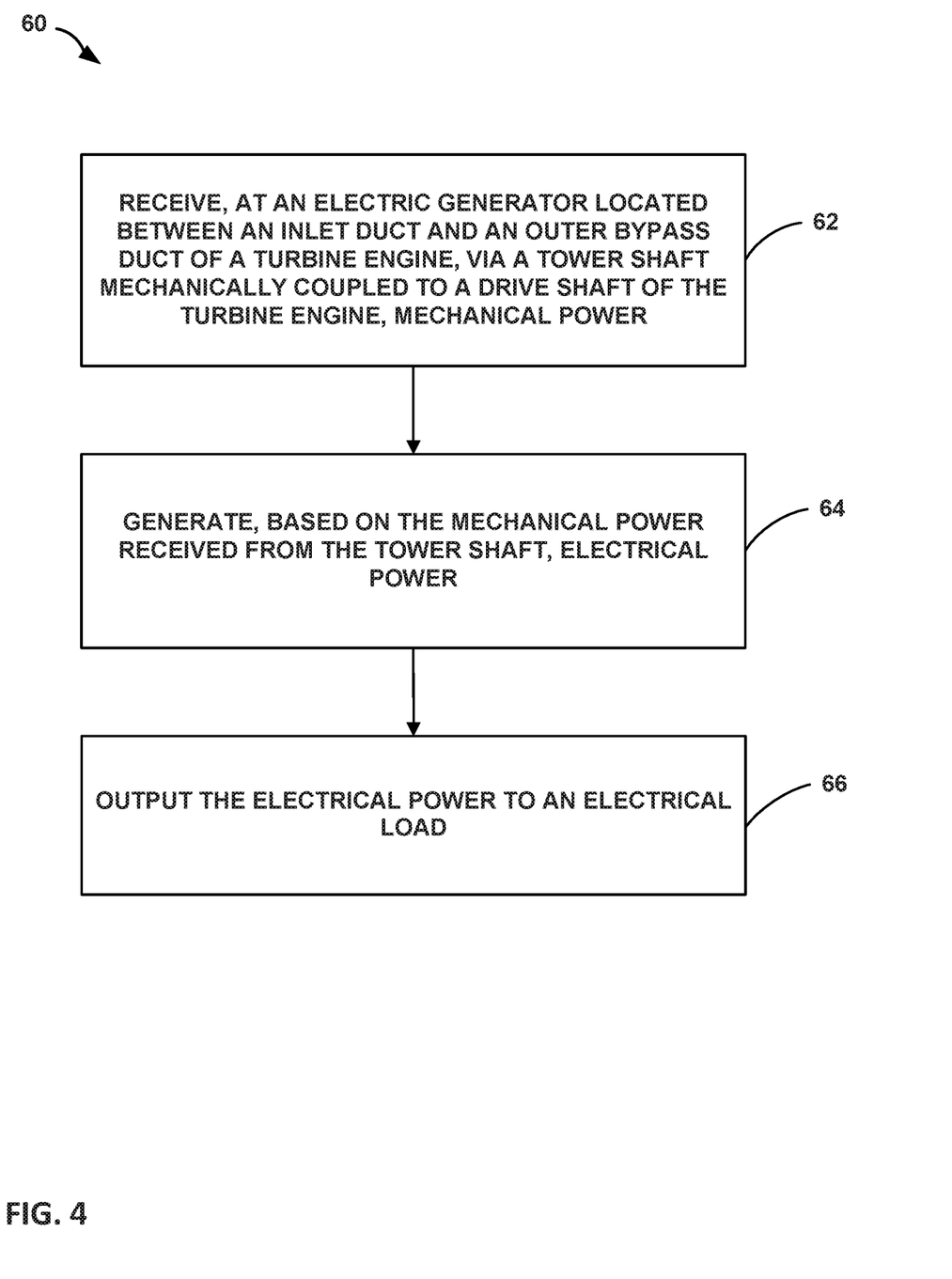
FIG. 4 is a flowchart illustrating an example process implemented by a system including a turbine engine with an embedded electric generator, in accordance with one or more techniques of this disclosure.

FIG. 4 is a flowchart illustrating an example process 60 implemented by a system including a turbine engine with an embedded electric generator, in accordance with one or more techniques of this disclosure. Operations 62-66 of process 60 are described in the context of turbine engine 2 of FIGS. 1 and 2.

Process 60 includes receiving, at electric generator 4 located between inlet duct 14 and outer bypass duct 16 of turbine engine 2, via tower shaft 8 mechanically coupled to drive shaft 6 of turbine engine 2, mechanical power (62). For example, if turbine engine 2 is part of an aircraft system, turbine engine 2 may spin drive shaft 6 during pre-fight or in-flight operations to provide mechanical power to drive shaft 6. Component 26 of electric generator 4, which may function as a rotor, may receive the mechanical power delivered to drive shaft 6 from tower shaft 8 through gearbox 22B. For example, component 26 may be configured to rotate based on the mechanical power received from tower shaft 8.

Process 60 also includes generating, based on the mechanical power received from tower shaft 8, electrical power (64). For example, component 26 may comprise a permanent magnet or an electromagnetic configured to induce an electrical current in an electrical winding of component 24. The electrical winding of component 24 may generate electrical power, in the form of an electrical current, based on the electromagnetic field created by component 26.

Process 60 also includes outputting the electrical power to electrical load 12 (66). For example, component 24 may include an electrical wire for transmitting the electrical power to electrical load 12, which may comprise a fuel pump, a hydraulic pump, a cabin load, an interior lighting and display system, and a heating and cooling system or any other component or system of the aircraft.

FIG. 4 has described the operation of turbine engine 2 in general. Electric generator 4 may be positioned in other locations within cavity 20 or in locations outside of cavity 20 between inlet duct 14 and outer bypass duct 16. A person having ordinary skill in the art will understand that process 60 is not the only example enabled by the techniques described in this disclosure, and that the systems described herein may combine the techniques described herein in other ways to operate in other operating modes.

As described in process 60, electric generator 4 may convert mechanical power to electrical power at a location in turbine engine 2 that improves the heat dissipation of electric generator 4. Positioning electric generator 4 between inlet duct 14 and outer bypass duct 16 may enable turbine engine 2 to dissipate heat from electric generator 4 using relatively simple heat exchangers 25 that use fluid from outer bypass duct 16. The location of electric generator 4 in turbine engine 2 may also improve the ease of access to electric generator 4 for maintenance. For example, a technician may be able to more easily access electric generator 4 for maintenance or inspections from outer bypass duct 16 than if electric generator 4 were to be positioned at a different location within turbine engine 2.

Figure 5:
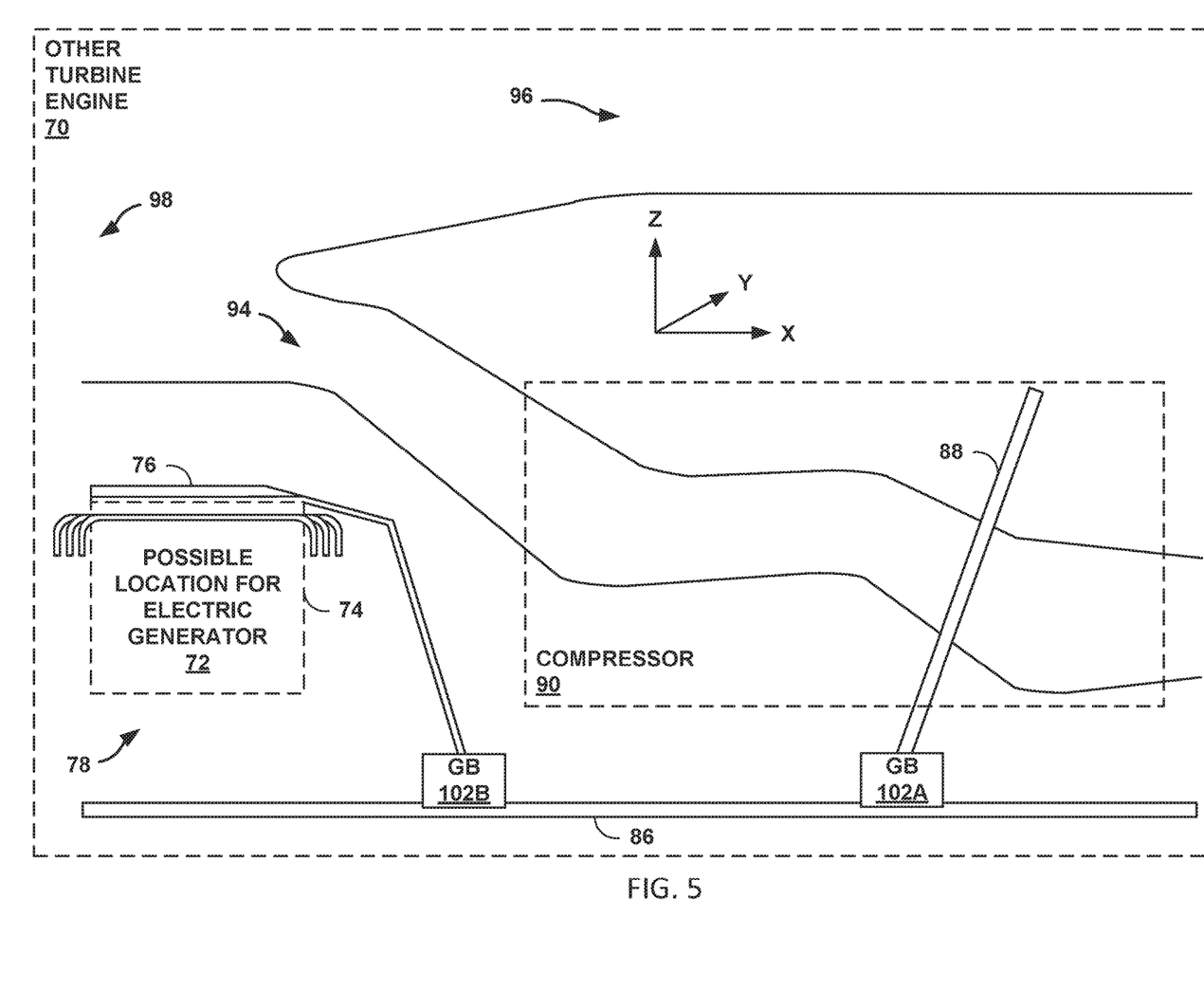
FIG. 5 is a conceptual diagram of a traditional turbine engine with an electric generator.

FIG. 5 is a conceptual diagram illustrating a traditional turbine engine 70 with an electric generator 72. Traditional turbine engine 70 may include drive shaft 86, tower shaft 88, compressor 90, inlet duct 94, outer bypass duct 96, intake 98, and gearbox 102A.

Unlike turbine engine 2 of FIGS. 1 and 2 which includes generator 4 positioned in cavity 20 between inlet duct 14 and bypass duct 16, traditional turbine engine 70 of FIG. 5 includes generator 72 positioned in cavity 78 which is positioned beneath intake 98 and inlet duct 94. That is, in cavity 78, electric generator 72 may be positioned above drive shaft 86 and mechanically coupled to receive mechanical power from drive shaft 86 but beneath inlet duct 94 and not above inlet duct 94. "Beneath" and "above" may be defined in terms of the Z direction, as depicted in FIG. 5. Component 76 may be configured to receive mechanical power from drive shaft 86 via an auxiliary gearbox 102B and/or a mechanical element. Component 74 may be configured to produce electrical power from the mechanical power received by component 76. Component 74 may output the electrical power to an electrical load (not shown in FIG. 5).

During operation, electric generator 72 may produce excess heat that may interfere with operations being performed by electric generator 72 and/or other collocated components of traditional turbine engine 70. Electric generator 72 in cavity 78 may be a farther distance from the cooler fluid in outer bypass duct 96 than the distance between electric generator 4 and outer bypass duct 16 in FIG. 2. The architecture and the configuration of turbine engine 70 may inhibit heat transfer away from electric generator 72. Therefore, due to its positioning in cavity 78, removing heat from electric generator 72 in cavity 78 may involve complex, heavy, and expensive equipment, such as heat exchangers. The heat exchangers for electric generator 72 in cavity 78 may be more complex and expensive than the heat exchangers for electric generator 4 in cavity 20 because of the longer distance from cavity 78 to outer bypass duct 96.

Electric generator 72 may also require occasional maintenance, which may require access to electric generator 72 within cavity 78 of traditional turbine engine 70. Performing maintenance or inspections of electric generator 72 in cavity 78 may be difficult as other collocated components of traditional turbine engine 70 obstruct access to electric generator 72. Maintenance personnel may need to disassemble or remove components of traditional turbine engine 70, such as compressor 90 and drive shaft 86, in order to access electric generator 72.

The following numbered examples demonstrate one or more aspects of the disclosure.

Example 1

A turbine engine comprises an intake, an inlet duct configured to receive fluid from the intake, and an outer bypass duct configured to receive fluid from the intake. The turbine engine further comprises a drive shaft, a tower shaft mechanically coupled to the drive shaft, and an electric generator mechanically coupled to the tower shaft, wherein the electric generator is located between the inlet duct and the outer bypass duct.

Example 2

The turbine engine of example 1, further comprising a compressor, wherein the tower shaft passes through the compressor, wherein the compressor is configured to compress fluid traveling through the inlet duct.

Example 3

The turbine engine of any combination of examples 1 or 2, wherein the compressor is beneath the outer bypass duct, wherein the electric generator is located between the compressor and the outer bypass duct.

Example 4

The turbine engine of any combination of examples 1 to 3, wherein the outer bypass duct comprises a bleed configured to provide cooling to the electric generator.

Example 5

The turbine engine of any combination of examples 1 to 4, wherein the drive shaft comprises a low-pressure shaft.

Example 6

The turbine engine of any combination of examples 1 to 5, wherein the tower shaft is mechanically coupled to the drive shaft by a gearbox.

Example 7

The turbine engine of any combination of examples 1 to 6, further comprising a fuel jacket configured to absorb heat from the electric generator.

Example 8

The turbine engine of any combination of examples 1 to 7, wherein the electric generator comprises a first component comprising a magnet, wherein the first component is coupled to the tower shaft; and a second component comprising a winding, wherein the second component is coupled to the compressor.

Example 9

The turbine engine of any combination of examples 1 to 8, wherein the electric generator is mechanically coupled to the tower shaft by a gearbox.

Example 10

The turbine engine of any combination of examples 1 to 9, wherein the electric generator is configured to deliver electricity to a fuel pump or a hydraulic pump.

Example 11

A method comprises receiving, at an electric generator located between an inlet duct and an outer bypass duct of a turbine engine, via a tower shaft mechanically coupled to a drive shaft of the turbine engine, mechanical power. The method further comprises generating, based on the mechanical power received from the tower shaft, electrical power. The method further comprises outputting the electrical power to an electrical load.

Example 12

The method of example 11, further comprising receiving fluid from the outer bypass duct to cool the electric generator; and transferring heat from the electric generator to the fluid from the outer bypass duct.

Example 13

The method of any combination of examples 1 to 12, further comprising receiving fuel in a fuel jacket; and transferring heat from the electric generator to the fuel in the fuel jacket.

Example 14

The method of any combination of examples 1 to 13, wherein receiving mechanical power via the tower shaft comprises receiving mechanical power at the electric generator via a gearbox mechanically coupled to the tower shaft.

Example 15

An electric generator module comprises a mechanical input configured to connect to a tower shaft that is mechanically coupled to a drive shaft of a turbine engine, wherein the tower shaft protrudes through a cavity of the turbine engine located between an inlet duct of the turbine engine and an outer bypass duct of the turbine engine, and receive mechanical power from the tower shaft. The electric generator module further comprises a power generation component configured to produce electrical power from mechanical power received by the mechanical input. The electric generator module further comprises an electrical output configured to output the electrical power produced by the power generation component to an electrical load.

Example 16

The electric generator module of example 15, wherein the power generation component comprises a first component comprising a magnet, wherein the first component is configured to mechanically couple to the tower shaft; and a second component comprising a winding, wherein the second component is configured to mechanically couple to a compressor of the turbine engine.

Example 17

The electric generator module of any combination of examples 15 to 16, further comprising a first heat exchanger configured to transfer heat from the electric generator module to fuel in a fuel jacket.

Example 18

The electric generator module of any combination of examples 15 to 17, further comprising a second heat exchanger configured to transfer heat from the electric generator module to fluid from the outer bypass duct.

Example 19

The electric generator module of any combination of examples 15 to 18, wherein the first component is configured to mechanically couple to the tower shaft by at least a gearbox; the first component is configured to rotate; and the second component is configured to not rotate.

Example 20

The electric generator module of any combination of examples 15 to 19, wherein the tower shaft is configured to pass through a compressor; the compressor is configured to compress fluid traveling through the inlet duct; the compressor is configured to be positioned beneath the outer bypass duct; and the electric generator module is located between the compressor and the outer bypass duct.

Various examples have been described. These and other examples are within the scope of the following claims.

What is claimed is:

1. A turbine engine comprising:
an intake;
an inlet duct configured to receive fluid from the intake;
an outer bypass duct configured to receive fluid from the intake;
a drive shaft;
a tower shaft mechanically coupled to the drive shaft; and
an electric generator mechanically coupled to the tower shaft,
wherein the electric generator is located between the inlet duct and the outer bypass duct,
wherein the outer bypass duct comprises a bleed configured to provide cooling to the electric generator, and
wherein the electric generator is configured to receive, via the bleed, as cooling to the electric generator, at least a portion of the fluid from the intake.

2. The turbine engine of claim 1, further comprising a compressor, wherein the tower shaft passes through the compressor, wherein the compressor is configured to compress fluid traveling through the inlet duct.

3. The turbine engine of claim 2, wherein the compressor is beneath the outer bypass duct, wherein the electric generator is located between the compressor and the outer bypass duct.

4. The turbine engine of claim 1, wherein the drive shaft comprises a low-pressure shaft.

5. The turbine engine of claim 1, wherein the tower shaft is mechanically coupled to the drive shaft by a gearbox.

6. The turbine engine of claim 1, further comprising a fuel jacket configured to absorb heat from the electric generator.

7. The turbine engine of claim 1, wherein the electric generator comprises:
a first component comprising a magnet, wherein the first component is coupled to the tower shaft; and
a second component comprising a winding, wherein the second component is coupled to the compressor.

8. The turbine engine of claim 1, wherein the electric generator is mechanically coupled to the tower shaft by a gearbox.

9. The turbine engine of claim 1, wherein the electric generator is configured to deliver electricity to a fuel pump or a hydraulic pump.

10. A method comprising:
receiving, at an electric generator located between an inlet duct and an outer bypass duct of a turbine engine, via a tower shaft mechanically coupled to a drive shaft of the turbine engine, mechanical power;
generating, based on the mechanical power received from the tower shaft, electrical power;
outputting the electrical power to an electrical load;
providing, by a bleed of the outer bypass duct, cooling to the electric generator; and
receiving, at the electric generator via the bleed, as cooling to the electric generator, fluid from the outer bypass duct that transfers heat from the electric generator.

11. The method of claim 10, further comprising:
receiving fuel in a fuel jacket; and
transferring heat from the electric generator to the fuel in the fuel jacket.

12. The method of claim 10, wherein receiving mechanical power via the tower shaft comprises receiving mechanical power at the electric generator via a gearbox mechanically coupled to the tower shaft.

13. An electric generator module comprising:
a mechanical input configured to:
connect to a tower shaft that is mechanically coupled to a drive shaft of a turbine engine, wherein the tower shaft protrudes through a cavity of the turbine engine located between an inlet duct of the turbine engine and an outer bypass duct of the turbine engine, and
receive mechanical power from the tower shaft;
a power generation component configured to produce electrical power from mechanical power received by the mechanical input; and
an electrical output configured to output the electrical power produced by the power generation component to an electrical load,
wherein the outer bypass duct comprises a bleed configured to provide cooling to the electric generator module, and
wherein the electric generator module is configured to receive, via the bleed, as cooling to the electric generator module, fluid from the outer bypass duct.

14. The electric generator module of claim 13, wherein the power generation component comprises:
a first component comprising a magnet, wherein the first component is configured to mechanically couple to the tower shaft; and
a second component comprising a winding, wherein the second component is configured to mechanically couple to a compressor of the turbine engine.

15. The electric generator module of claim 14, wherein:
the first component is configured to mechanically couple to the tower shaft by at least a gearbox;
the first component is configured to rotate; and
the second component is configured to not rotate.

16. The electric generator module of claim 13, further comprising a first heat exchanger configured to transfer heat from the electric generator module to fuel in a fuel jacket.

17. The electric generator module of claim 13, further comprising a second heat exchanger configured to transfer heat from the electric generator module to the fluid from the outer bypass duct.

18. The electric generator module of claim 13, wherein:
the tower shaft is configured to pass through a compressor;
the compressor is configured to compress fluid traveling through the inlet duct;
the compressor is configured to be positioned beneath the outer bypass duct; and
the electric generator module is located between the compressor and the outer bypass duct.

19. The electric generator module of claim 13, wherein the mechanical input is configured to connect to the tower shaft that is mechanically coupled to a low-pressure shaft of the turbine engine.

20. The electric generator module of claim 13, wherein the electrical output is configured to output the electrical power produced by the power generation component to a fuel pump or a hydraulic pump.

* * * * *